United States Patent
Kwon et al.

(10) Patent No.: US 8,200,889 B2
(45) Date of Patent: Jun. 12, 2012

(54) VARIABLE SPACE PAGE MAPPING METHOD AND APPARATUS FOR FLASH MEMORY DEVICE

(75) Inventors: Hunki Kwon, Seoul (KR); Eunsam Kim, Seoul (KR); Jongmoo Choi, Seoul (KR); Donghee Lee, Seoul (KR); Sam H. Noh, Seoul (KR)

(73) Assignee: University of Seoul Industry Cooperation Foundation, Dongdaemun-gu, Seoul (KR)

(*) Notice: Subject to any disclaimer, the term of this patent is extended or adjusted under 35 U.S.C. 154(b) by 314 days.

(21) Appl. No.: 12/572,165

(22) Filed: Oct. 1, 2009

(65) Prior Publication Data

US 2010/0082886 A1 Apr. 1, 2010

(30) Foreign Application Priority Data

Oct. 1, 2008 (KR) ........................ 10-2008-0096581

(51) Int. Cl.
*G11C 11/34* (2006.01)
*G06F 12/00* (2006.01)

(52) U.S. Cl. ................... 711/103; 365/185.33; 711/170; 711/E12.008

(58) Field of Classification Search ............. 365/185.33; 711/103, 170, E12.008
See application file for complete search history.

(56) References Cited

U.S. PATENT DOCUMENTS

2007/0033331 A1* 2/2007 Sinclair et al. ................ 711/103
2007/0033332 A1* 2/2007 Sinclair et al. ................ 711/103

FOREIGN PATENT DOCUMENTS

| KR | 10-2004-0009926 A | 1/2004 |
| KR | 10-2005-0070672 A | 7/2005 |
| KR | 10-2006-0090087 A | 8/2006 |

* cited by examiner

*Primary Examiner* — Kevin Ellis
*Assistant Examiner* — Mehdi Namazi
(74) *Attorney, Agent, or Firm* — Marger Johnson & McCollom PC

(57) ABSTRACT

Disclosed is a method and apparatus embodying a flash translation layer (FTL) in a storage device including a flash memory. The FTL may classify a block into a sequential group and a fusion group based on a locality of a write request. The FTL may store data in blocks of the fusion group by using a page mapping scheme, and sequentially store data by using a block mapping scheme. The FTL may improve efficiency of garbage collection operation that is performed by using limited redundant blocks and also may increase efficiency of a non-sequential reference operation.

21 Claims, 7 Drawing Sheets

META BLOCK -> META BLOCK

VARIABLE SPACE PAGE MAPPING METHOD AND APPARATUS FOR FLASH MEMORY DEVICE

CROSS-REFERENCE TO RELATED APPLICATION

This application claims the benefit of Korean patent application No. 10-2008-0096581, filed on Oct. 1, 2008, in the Korean Intellectual Property Office, the disclosure of which is incorporated herein by reference.

BACKGROUND OF THE INVENTION

1. Field of the Invention

The following description relates to a memory device and a management method for the memory device, and more particularly, to a non-volatile memory-based memory device and a management method for the memory device.

2. Description of Related Art

Examples of a storage device storing data include a magnetic disk, a semiconductor device, and the like. Since physical characteristics are different for each type of storage device, a management method corresponding to the physical characteristic is required.

Conventionally, the magnetic disk is widely used. A read/write time of the magnetic disk takes an average of several milliseconds per kilobyte. Also, the read/write time of the magnetic disk varies, since an arrival time of an arm is different depending on a physical location of where data is stored.

Recently, a non-volatile memory device which, compared with the magnetic disk, takes a relatively short read/write time, consumes a small amount of power, and occupies a small amount of space, has been rapidly replacing the magnetic disk as the price of the non-volatile memory decreases.

The non-volatile memory device is able to electrically read, write, and erase, and the non-volatile memory device is a semiconductor device that is able to maintain stored data even when power is cut off. A process of storing data in the non-volatile memory device is referred to as programming as well as writing.

Programming with respect to the non-volatile memory device may be performed by a page unit and erasing may be performed by a block unit. A block may include a plurality of pages. A controller of the non-volatile memory device may provide a logical address to an external host or processor, and also provide a physical address with respect to a non-volatile memory device. The controller may manage the non-volatile memory device using the physical address and may convert the physical address into the logical address. A layer where converting of the physical address and logical address is performed as described above is referred to as a flash translation layer (FTL). Operations performed in the FTL, such as decision, classification, arrangement, and the like, are referred to as a management method of a flash memory device.

SUMMARY OF THE INVENTION

An aspect of the exemplary embodiments provides a memory management apparatus and method that may classify variable number of non-sequential blocks and redundant blocks as a fusion group to improve efficiency of a garbage collection operation that uses a limited number of redundant blocks.

Another aspect of the exemplary embodiments provides a memory management apparatus and method that may classify and separately manage a block where data is sequentially stored, to reduce a cost for reusing blocks where data is sequentially stored.

Another aspect of the exemplary embodiments provides a memory management apparatus and method that may apply a page mapping scheme in blocks classified as a fusion group, to reduce a data update cost caused by a non-sequential access operation Another aspect of the exemplary embodiments provides a memory management apparatus and method that may determine a sequential access and a non-sequential access, and may selectively apply merge schemes or garbage collection with respect to each access operation, to reduce a data update cost for an entire non-volatile memory.

Another aspect of the exemplary embodiments provides a memory management apparatus and method that may establish a mathematical model with respect to a garbage collection cost and a data access cost, to optimize a fusion group.

One or more embodiments of the present disclosure may provide an apparatus of managing a memory, that includes a block classification unit to classify each of a plurality of blocks of a non-volatile memory into a sequential group or a fusion group based on a locality of access operations with respect to each of the plurality of blocks. Also it includes applying different mapping unit to data in a Sequential group or to data in a Fusion group.

One or more embodiments of the present disclosure may provide a method for managing a memory that includes determining a locality of access operations with respect to each of a plurality of blocks of a non-volatile memory, determining each of the plurality of blocks as one of a sequential block, a non-sequential block. Also it includes reserving some redundant blocks for merge operation in Sequential group or garbage collection in Fusion group.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF EMBODIMENTS

Figure 1:
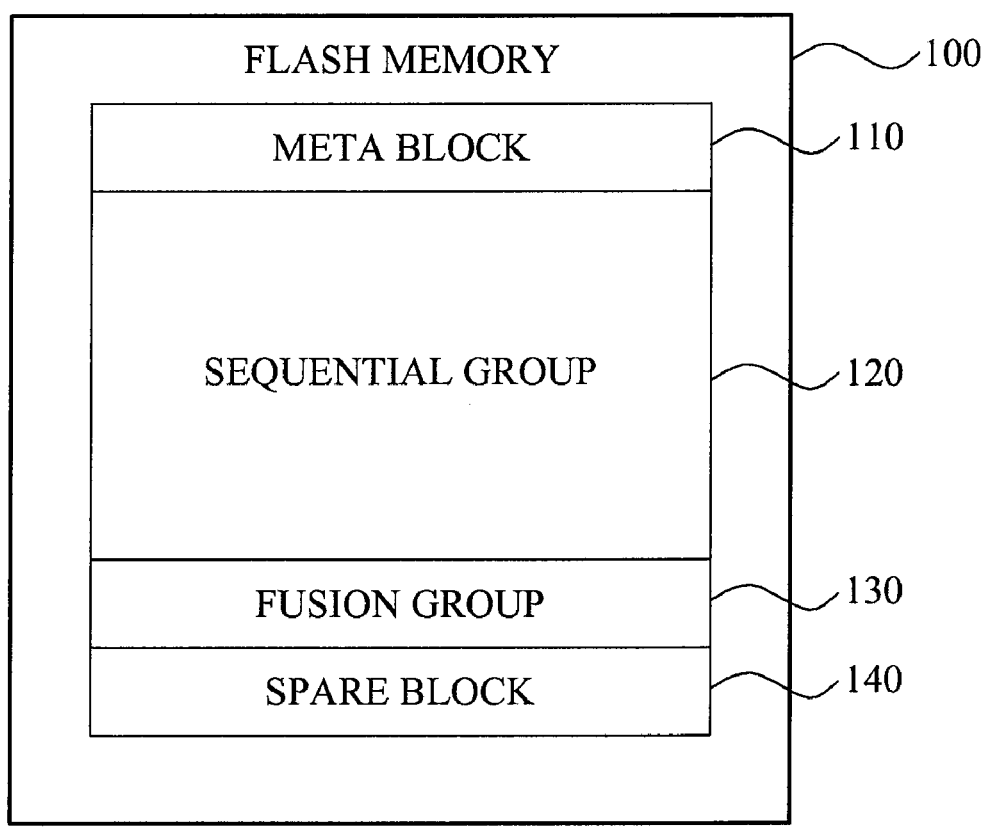
FIG. 1 illustrates an example of a flash memory managed by a memory management apparatus according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

A memory device throughout the present specification includes a non-volatile memory and a storage device storing data.

FIG. 1 illustrates an example of a flash memory 100 managed by a memory management apparatus according to an embodiment of the present invention.

The memory management apparatus may classify each of a plurality of blocks of the flash memory 100 into a meta block 110, a sequential group 120, a fusion group 130, and a redundant block(s) 140.

The meta block 110 may store information about a logical page and a logical block mapped to each of the plurality of blocks in the flash memory 100, and may store information required for a boot.

The memory management apparatus classifies a block where logical pages are sequentially stored among the plurality of blocks of the flash memory 100, as the sequential group 120.

The memory management apparatus may classify a block where data is non-sequentially stored among the plurality of blocks of the flash memory 100 as the fusion group 130. The memory management apparatus may also assign some number of redundant blocks to the fusion group 130 for garbage collection. The memory management apparatus may store, in a physical block included in the fusion group 130, logical pages included in at least one logical block, by using a page mapping scheme. In the fusion group, the page mapping scheme may be applied.

The redundant blocks 140 are blocks to make room for garbage collection or merge. They were reserved for the other purpose than storing data by a flash translation layer (FTL). Some redundant blocks may belong to the fusion group 130 and may be used for garbage collection and some other redundant blocks may belong to Sequential group 120 and may be used for a merge operation of sequential blocks.

A 'physical block' and a 'physical page' in the present specification may respectively indicate a block and a page of the flash memory 100. The 'logical block' and the 'logical page' may indicate a block and a page that the FTL recognizes or an external host of the flash memory 100 recognizes.

The memory management apparatus may perform mapping of a single logical page to a single physical page in Fusion Area, which is referred to as page mapping. Also the memory management apparatus may perform mapping of a single logical block to a single physical block in Sequential Area. However, it is possible to use mapping of a single logical page to a single physical page in Sequential Area. Sector data is sequentially stored in the logical page. How many sectors are stored in the logical page depends on a size of a page.

When the memory management apparatus uses a block mapping scheme, the memory management apparatus may map a logical block to at least one physical block, and may manage the flash memory 100 based on mapping information. When the memory management apparatus uses a page mapping scheme, like the fusion group, a predetermined logical block may not be mapped to a predetermined physical block, a logical page of a logical block may be stored in a plurality of physical blocks, and mapping information associates a logical page and a location that consists of a corresponding physical block and a corresponding physical page in the block.

A memory management method described in the exemplary embodiments may be referred to as a variable space page mapping (VSPM). However, it is apparent to one skilled in the art that the VSPM should be understood as not limiting the scope of the present invention.

Figure 2:
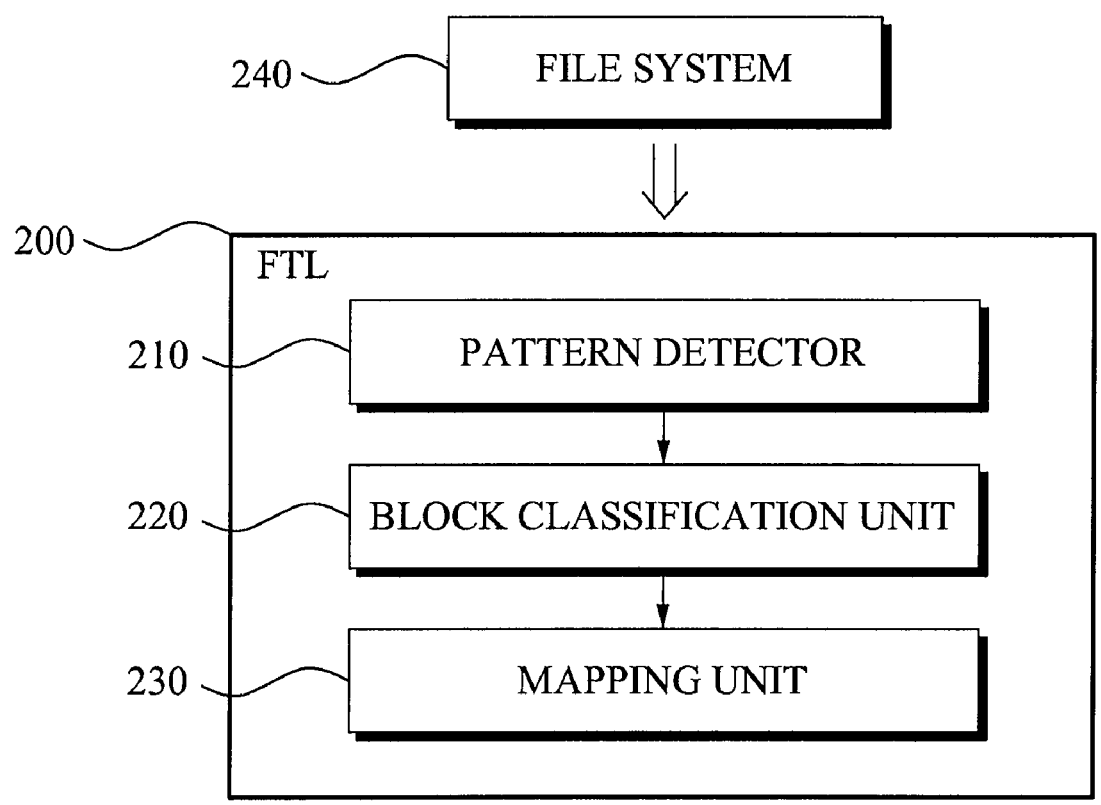
FIG. 2 illustrates an example of a memory management apparatus according to an embodiment of the present invention.

FIG. 2 illustrates an example of a memory management apparatus 200 according to an embodiment of the present invention.

The memory management apparatus 200 may receive, from a file system 240, a reference operation or an access operation with respect to the flash memory 100. The file system 240 is recognized by a host and is related to an operating system. The file system 240 may convert information of a file and/or a process recognized by the host into logical address information with respect to the flash memory 100. The logical address information may be a sector number and memory management apparatus 200 may convert the sector number into a logical block address, namely, a logical block number, and a logical page address, namely, a logical page number. And then the memory management apparatus 200 may convert them to corresponding physical block number, and a physical page address.

The file system 240 may transmit sector number to the memory management apparatus 200. The memory management apparatus 200 is referred to as an FTL, and may convert the sector number to logical address information. And then the memory management apparatus 200 may convert the logical address information into the physical address information of the flash memory 100. The memory management apparatus 200 may map a logical block and/or a logical page to a physical block and/or a physical page.

The access operation or the reference operation may include a read and/or write operation with respect to at least one sector data stored in the flash memory 100.

The memory management apparatus 200 may include a pattern detector 210, a block classification unit 220, and a mapping unit 230.

The memory management apparatus 200 may classify each of a plurality of blocks of a non-volatile memory (for example, the flash memory 100) into a sequential group and a fusion group based on a locality of access operations with respect to each of the plurality of blocks.

A host tends to read or write, sequentially and all at one time, data stored in the flash memory 100. This is referred to as a spatial locality.

However, once the host accesses data, the host tends to repeatedly access the same data. The host accesses the data, which once accessed, is accessed again within a relatively short time. The tendency is referred to as a temporal locality.

The pattern detector 210 may detect a pattern of an access operation of logical blocks with respect to each of the plurality of blocks of the flash memory 100. As an example, when the access operation accesses more than a predetermined number of consecutive data, the pattern detector 210 may regard the access operation as a sequential access. Conversely, when the access operation accesses data in logical blocks non-sequentially or randomly or when the number of the consecutive logical data is less than a predetermined number, the pattern detector 210 may regard the access operation as a non-sequential access.

The block classification unit 220 may classify each of the plurality of blocks into the sequential group 120 or the fusion group 130 based on whether the access operation with respect to each of the plurality of blocks is the sequential access or not. When the access operation is the sequential access, the block classification unit 220 may classify a block corresponding to the access operation as the sequential group 120 and when the access operation is the non-sequential access, the block classification unit may classify the block corresponding to the access operation as the fusion group 130.

The sequential group 120 is a set of blocks corresponding to the sequential access and is not restricted by a logical address or a physical address. Also, some redundant blocks may be assigned to the sequential group 120 for block recycling such as merge. The sequential group 120 may be referred to as a refined area.

The fusion group 130 is also a set of blocks corresponding to the non-sequential access, and is not restricted by a logical address or a physical address. Also, some redundant blocks may be assigned to the fusion group 130 for block recycling such as garbage collection.

The mapping unit 230 may apply a block mapping scheme for sequential group 120 where sector data might be stored sequentially in a block, and may apply a page mapping scheme for fusion group 130 where data that belong to other logical blocks may be intermixed in a physical block.

A pure set of the redundant blocks where data is not stored is illustrated as the redundant block 140. Some redundant blocks may be included in the fusion group 130, while the other redundant blocks are not included in the fusion group 130. The redundant block 140 in FIG. 1 is illustrated as being separate. The redundant block 140 may be included in the fusion group 130.

When a block satisfies a sequential condition, although the block is currently included in the fusion group 130, the block classification unit 220 or the pattern detector 210 may extract the block from a fusion group 130 and may classify the block as the sequential group 120. The block may be excluded from the fusion group 130 and the block now meets the sequential condition, which is satisfied when each of the pages is stored once in a single block, although the pages in the block are not stored according to a sequence of an address. This operation may be referred to as a defusion operation.

When data in a block is not accessed sequentially, although the block is currently included in the sequential group 120, the block classification unit 220 or the pattern detector 210 may classify the block as the fusion group 130 and may exclude the block from the sequential group. This operation may be referred to as a Fusion operation. The memory management apparatus 200 may dynamically classify each block of the flash memory 100 as the sequential group 120 or the fusion group 130 with the Fusion and Defusion operations.

The memory management apparatus 200 may perform a garbage collection operation with respect to a block included in the fusion group 130. The garbage collection operation is a process of collecting valid data over blocks into an empty block so as to make empty redundant blocks or unused space in a block.

The memory management apparatus 200 may apply a page mapping scheme with respect to the fusion group 130, and may apply a block mapping scheme with respect to the sequential group 120. In this instance, the page mapping scheme may play a role of a superset of the block mapping scheme, and thus, block mapping can be emulated by page mapping by applying some restrictions on which logical page can reside on which logical block. When the page mapping scheme plays a role of the superset of the block mapping scheme, the memory management apparatus 200 may assign all logical pages corresponding to the sequential group 120 to a predetermined logical block, thereby obtaining a similar result as the block mapping scheme, Since the block mapping scheme is a scheme for mapping a logical block to a physical block, all logical pages included in a single logical block are mapped to physical pages of a corresponding physical block. Also, since the page mapping scheme is a scheme for mapping a logical page to a physical page, different logical pages included in a single logical block may be stored in different physical blocks. Accordingly, a single physical block managed by the page mapping scheme may store logical pages from different logical blocks.

Mapping information that indicates which logical block corresponds to which physical block no longer exists in the fusion group 130. When a logical block enter the fusion group 130, mapping information that associates the logical block with a physical block may be no longer needed. Only information concerning logical blocks included in the fusion group 130 and information concerning a number of redundant blocks included in the fusion group are meaningful. When the logical block joins the fusion group 130, a physical block that is assigned to the logical block also joins the fusion group 130. Therefore, dynamically joined physical blocks and initially or dynamically assigned redundant blocks form a single fusion group 130, and those blocks provide a storage space and a garbage collection space for all logical pages included in the fusion group 130.

The memory management apparatus 200 may maintain at least two pure empty blocks, in the fusion group, all pages of which are completely unused, to perform a garbage collection operation and a defusion operation. A scheme where the fusion group 130 internally maintains at least two empty blocks or a scheme where the fusion group 130 obtains an empty block from the set of the redundant blocks 140 as required and returns a single block to the set of the redundant block 140 after finishing an operation has the same effect.

Figure 3:
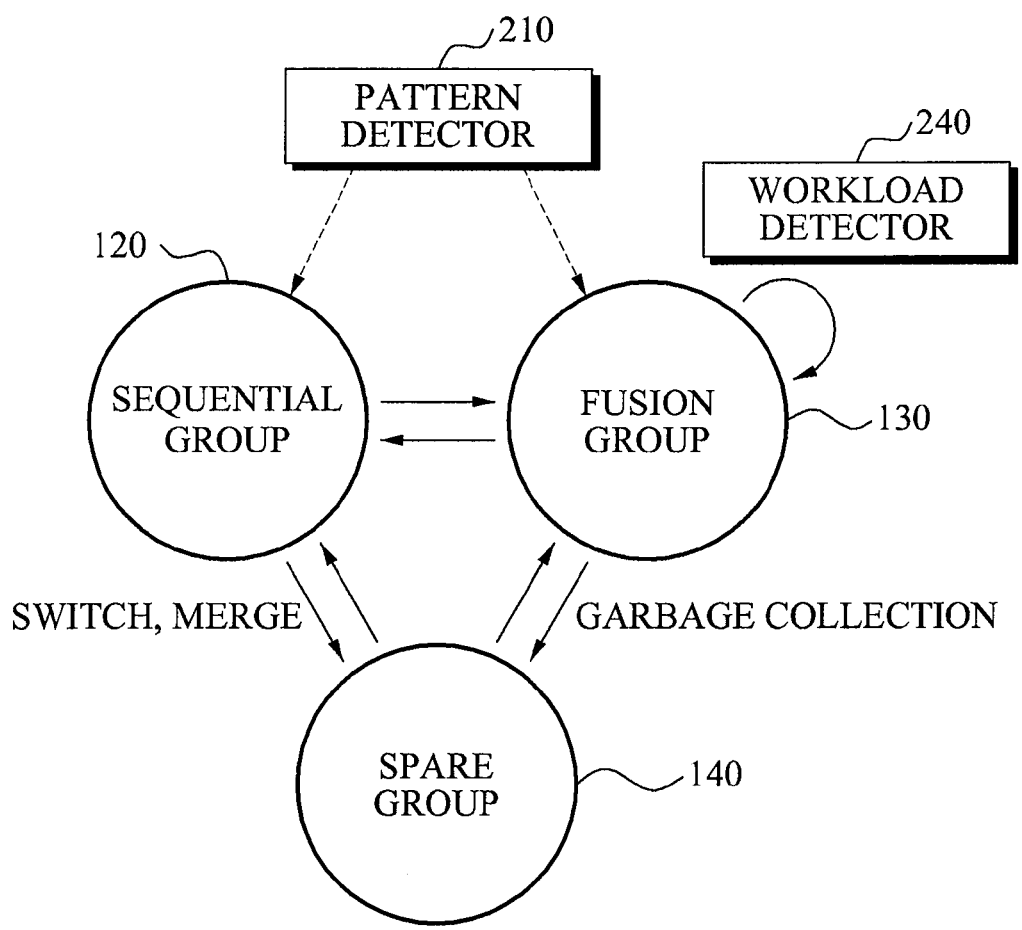
FIG. 3 illustrates an example of an operation of a memory management apparatus.

FIG. 3 illustrates an example of an operation of a memory management apparatus 200.

The pattern detector 210 may classify a block as either the sequential group 120 or the fusion group 130.

A workload detector 240 may detect a characteristic of a reference behavior in the fusion group 130, and may control a number of logical blocks included in the fusion group 130. When a single logical block is excluded from the fusion group 130 and is classified as a sequential block, a physical block is needed to store data of the corresponding logical block. As a result, a number of physical blocks included in the fusion group 130 may decrease.

The memory management apparatus 200 may classify a block included in the sequential group 120 as the fusion group 130 by performing a fusion operation, and may reclassify a block included in the fusion group 130 as the sequential group 120 by performing a defusion operation.

The memory management apparatus 200 may perform a switch merge operation with respect to the block included in the sequential group 120, and thereby may switch the block into the redundant block 140. Also, the memory management apparatus 200 may perform a garbage collection operation with respect to the block include in the fusion group 130, and thereby may switch the block into an empty block or the redundant block 140.

The memory management apparatus 200 may update a current state of each block of the flash memory 100, that is, may update mapping information and information about groups where each block belongs, in a map on a main memory and/or may store the updated map in the meta block 110.

Figure 4:
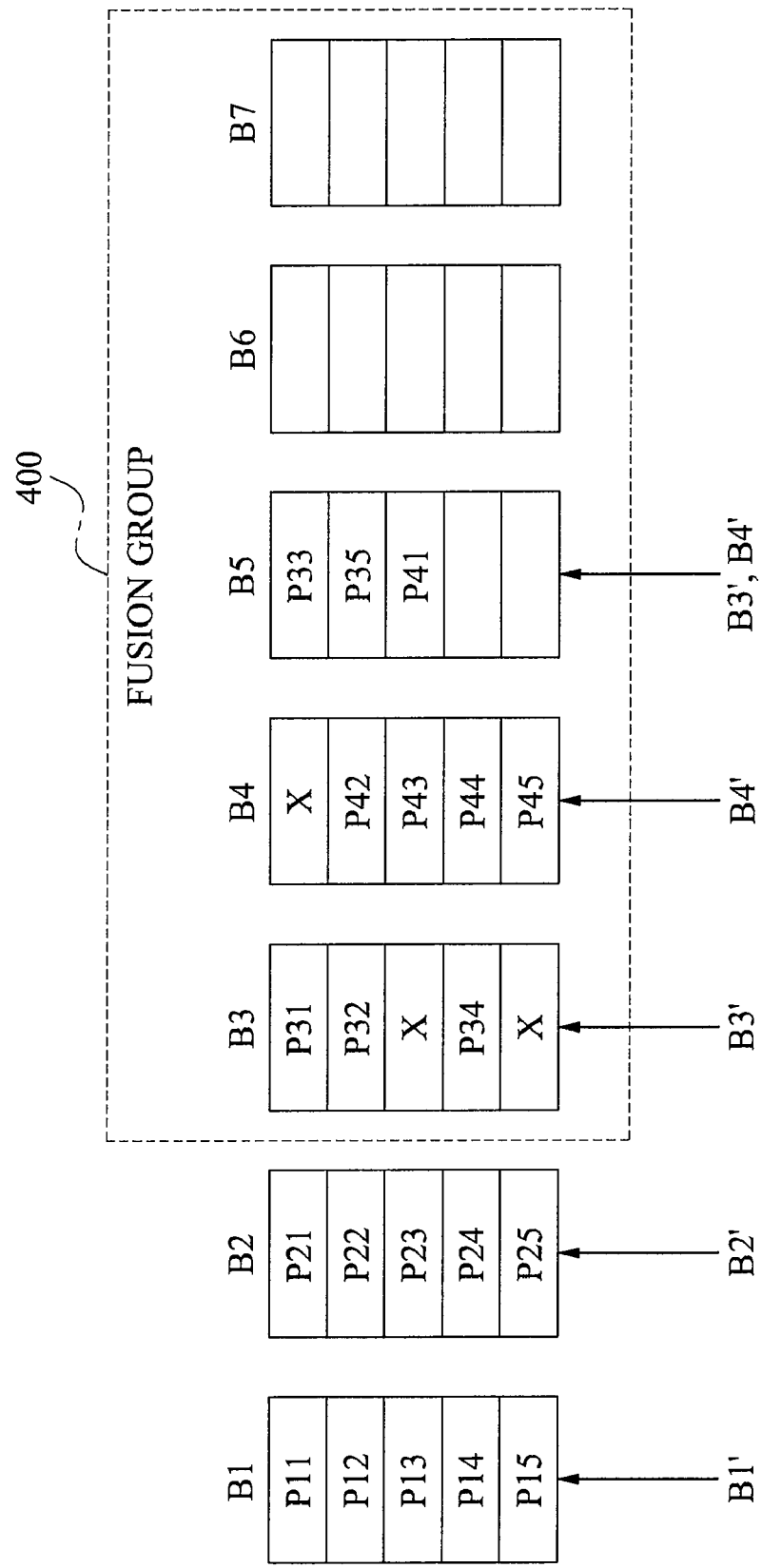
FIG. 4 illustrates an example of an operation of the memory management apparatus of FIG. 2.

FIG. 4 illustrates an example of an operation of the memory management apparatus 200 of FIG. 2

The fusion group 400 includes physical blocks B3, B4, B5, B6, and B7.

B5, B6, and B7 are redundant blocks and were assigned to Fusion group. Now B5 is used to store updated logical pages and B6 and B7 are still unused redundant blocks. B1 and B2 are included in a sequential group.

The block B1 corresponds to a logical block B1', and stores logical pages P11, P12, P13, P14, and P15. The block B2 corresponds to a logical block B2', and stores logical pages P21, P22, P23, P24, and P25.

Since a page mapping scheme is applied to the fusion group 400, it may be possible that a single logical block may not correspond to only a single physical block.

There is no predetermined physical block corresponding to the logical block in the fusion group. In FIG. 4, logical pages of the logical block B3' are stored in the physical blocks B3 and B5. When a page of a predetermined logical block is stored in a physical block, the corresponding logical block is marked in FIG. 4. However, the mark does not indicate that the predetermined logical block corresponds to a single physical block or to multiple physical blocks. The physical block B3 may store logical pages P31, P32, and P34. X indicates that data stored in the physical block is invalid. Valid logical pages P33 and P35 are stored in the physical block B5.

Pages of a logical block B4' may be stored in the physical blocks B4 and B5. The physical block B4 stores logical pages P42, P43, P44, and P45. A valid logical page P41 is stored in the physical block B5.

The memory management apparatus 200 may select the physical block B5 as a buffering block. A new page that is changed among logical pages of all logical blocks included in a fusion group 400 may be written to the buffering block. The memory management apparatus 200 may select a single block or a plurality of blocks as the buffering block.

Figure 5:
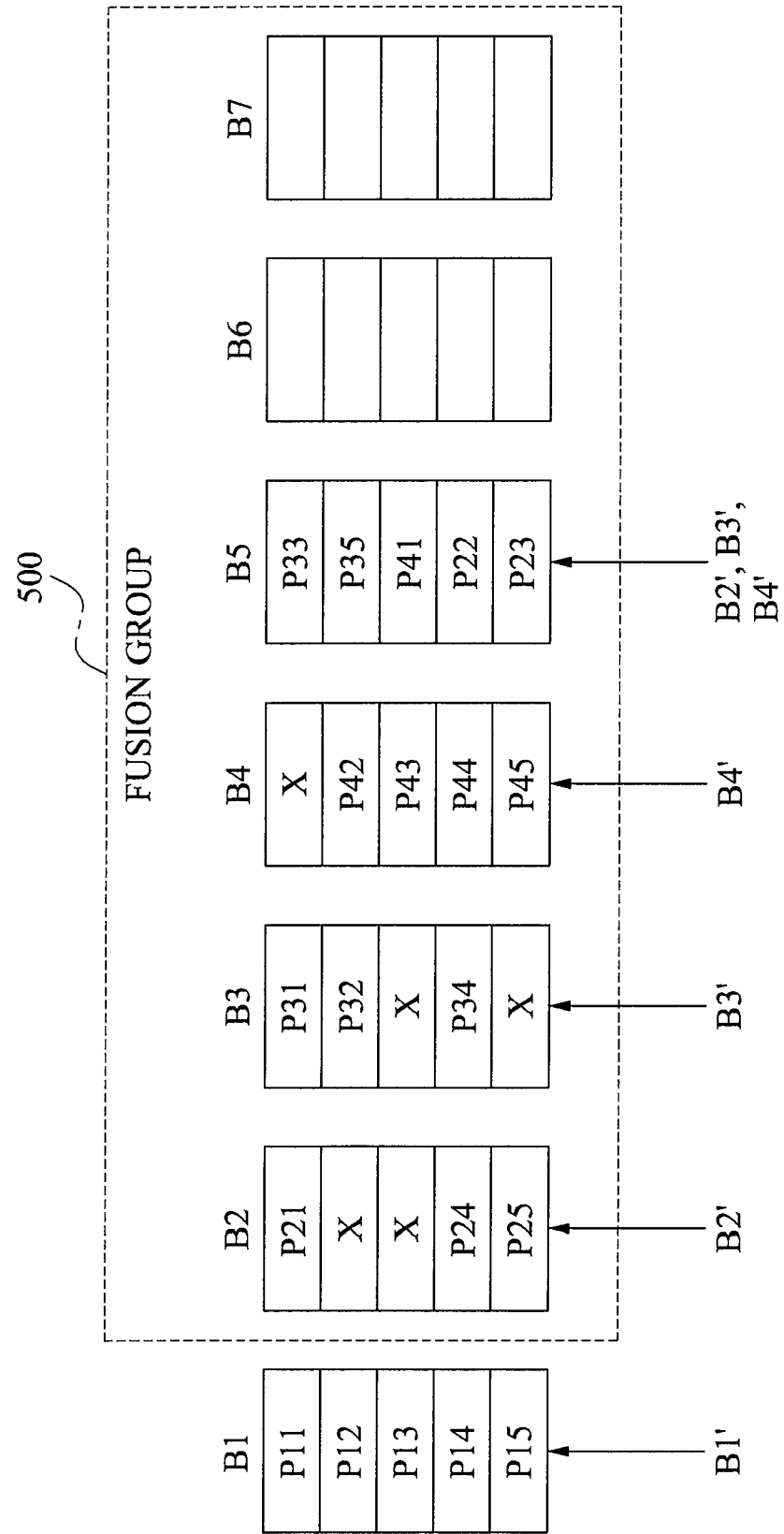
FIG. 5 illustrates an example of a fusion operation of the memory management apparatus of FIG. 2.

FIG. 5 illustrates an example of a fusion operation of the memory management apparatus 200 of FIG. 2.

A logical block B2' is included in a sequential group, and corresponds to a physical block B2. When it is determined that the logical block B2' is referenced non-sequentially or is no longer satisfies a sequential condition, a memory management apparatus 200 assigns the logical block B2' to the fusion group 500. Then, the logical block B3' is included in the fusion group 500, and the physical block B2 corresponding to the logical block B2' is also a member of the fusion group. Also, when logical pages P22 and P23 of the logical block B2' are updated, the updated logical pages P22 and P23 are stored in a buffering block B5 of the fusion group 500. Also the memory management apparatus 200 invalidates previous logical pages P22 and P23 in the physical block B2 where the previous logical pages of the logical block B2' are stored. Now, the buffering block B5 has logical pages of the logical blocks B2', B3', and B4'.

Figure 6:
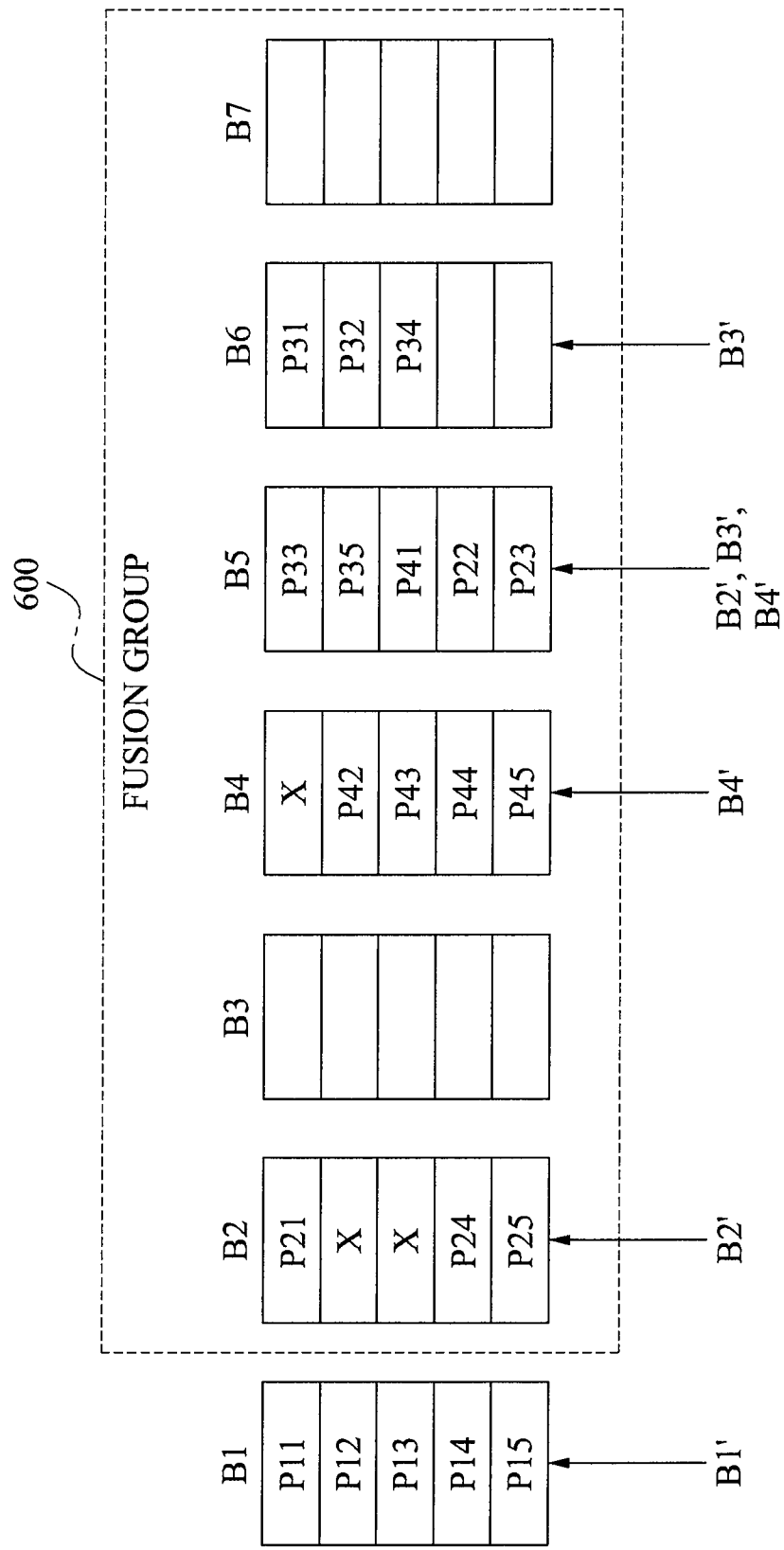
FIG. 6 illustrates an example of a garbage collection operation of the memory management apparatus of FIG. 2.

FIG. 6 illustrates an example of a garbage collection operation of the memory management apparatus 200 of FIG. 2.

In this instance, referring to FIGS. 5 and 6, the memory management apparatus 200 may select one of physical blocks B2 and B3 that have the smallest number of valid pages, as a target of a garbage collection operation.

It is assumed that the memory management apparatus 200 selects a physical block B3 as a target for the garbage collection operation. The memory management apparatus 200 may copy logical pages P31, P32, and P34 stored in the physical block B3 to a physical block B6. In this instance, logical pages of the logical bock B3' may be stored in the physical blocks B5 and B6.

The memory management apparatus 200 may erase the physical block B3. The memory management apparatus 200 may make the physical block B3 to be a completely empty block.

The memory management apparatus 200 may maintain at least two empty blocks in the fusion group 500, for performing the garbage collection operation and defusion operation. Accordingly, the memory management apparatus 200 may maintain empty blocks B3 and B7 in the fusion group 500. Depending on embodiments, the empty block may not be maintained in the fusion group 500, and in this instance, empty blocks from the redundant block 140 are used and a same number of empty blocks are returned to the redundant block 140 after an operation is finished. However, it is assumed that the fusion group 500 maintains at least two empty blocks, when an example embodiment is explained.

Figure 7:
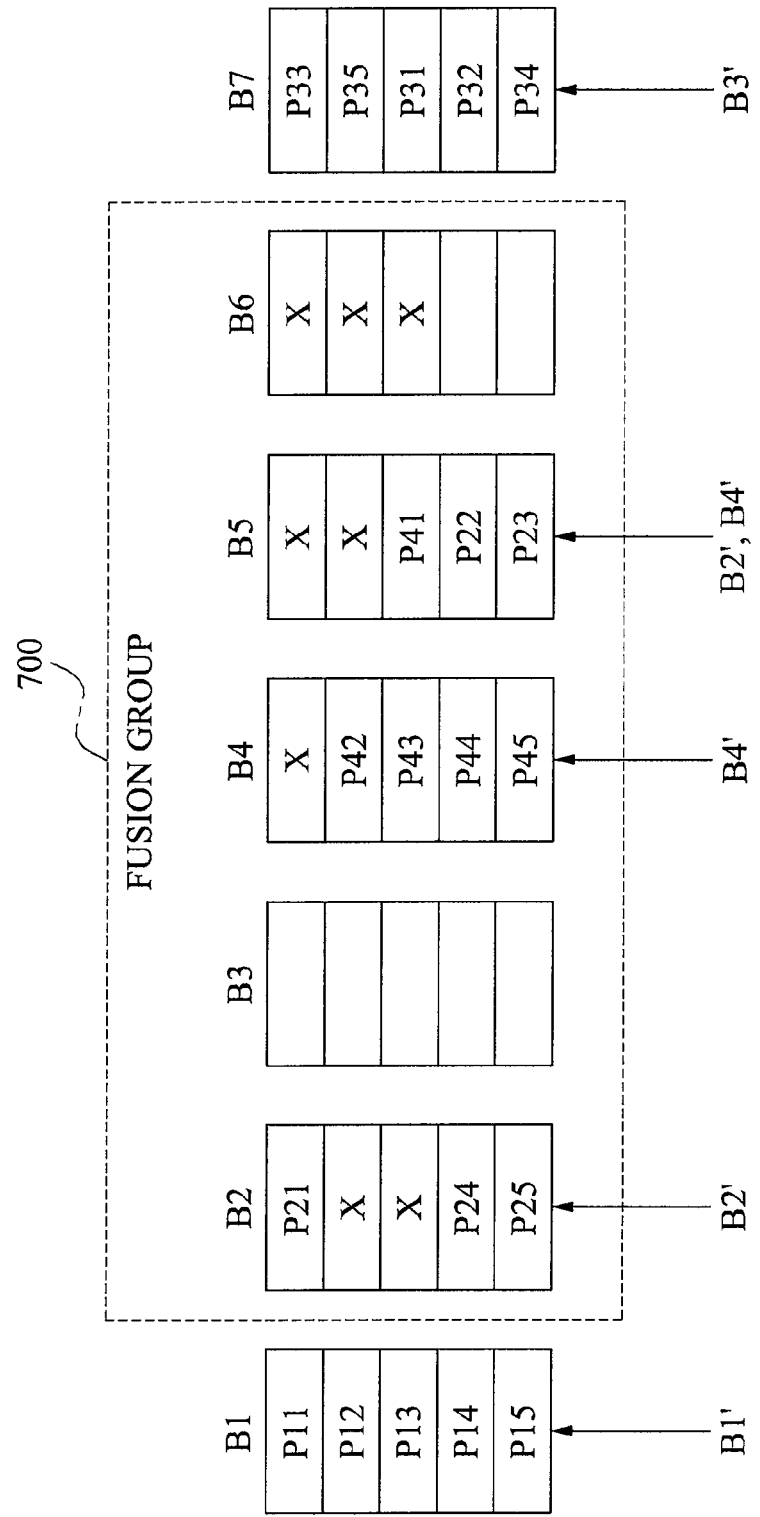
FIG. 7 illustrates an example of a defusion operation of the memory management apparatus of FIG. 2.

FIG. 7 illustrates an example of a defusion operation of the memory management apparatus 200 of FIG. 2

Referring to FIGS. 6 and 7, pages of a logical block B3' are stored in physical blocks B5 and B6.

When an access operation with respect to the logical block B3' is not frequently performed, the memory management apparatus 200 may separate the logical block B3' from a fusion group 700.

The memory management apparatus 200 may copy logical pages P33 and P35 from the physical block B5 to a physical block B7, and may copy logical pages P31, P32, and P34 from the physical block B6 to a physical block B7.

The memory management apparatus 200 may invalidate invalid logical pages of the physical blocks B5 and B6.

Since all data of the logical block B3' is stored in the physical block B7, the memory management apparatus 200 may separate the physical block B7 and the logical block B3' from the fusion group 700.

In this instance, all the logical pages of the logical block B3' are respectively stored once in the physical block B7, and thus, the physical block B7 satisfies a sequential condition.

Since only one empty block remains in the fusion group 700, the memory management apparatus 200 may perform a garbage collection operation to add an empty block.

In this instance, the memory management apparatus 200 may select a physical block B6 that has a smallest number of valid pages, as a target for the garbage collection operation. Since the physical block B6 does not store a valid page, the memory management apparatus 200 may perform the garbage collection operation by erasing the physical block B6 without an additional copying process.

When the garbage collection operation is completed, the fusion group 700 may include two empty blocks B3 and B6.

Pages of a logical block B2' exist in physical blocks B2 and B5, and pages of logical block B4' exist in physical blocks B4 and B5.

Referring again to FIG. 2, the block classification unit 220 may determine a number of logical blocks in the fusion group 130 (or a number of physical blocks corresponding to existing logical blocks in the fusion group 130). The block classification unit 220 may determine a number of redundant blocks participating in the fusion group 130. In this instance, the block classification unit 220 may determine the number of logical blocks in the fusion group 130 (or a number of physical blocks corresponding to existing logical blocks in the fusion group 130) and the number of redundant blocks participating in the fusion group 130, based on a ratio of a number of an access operations with respect to the fusion group 130 to a number of access operations with respect to the flash memory 100.

For ease of description, the ratio of the number of the access operations with respect to the fusion group 130 to the number of access operations with respect to the flash memory 100 is defined as a reference probability in the current specification, It is assumed that a number of redundant blocks, which are included in the fusion group 130 by the block classification unit, is fixed. For ease of description, a value obtained by dividing the number of logical blocks participating in the fusion group 130 by the number of all blocks existing in the fusion group 130 is defined as a utilization rate of the fusion group 130. In this instance, the number of all blocks existing in the fusion group 130 is a sum of the number of logical blocks in the fusion group 130 and the number of redundant blocks assigned to the fusion group 130. When the number of redundant blocks assigned to the fusion group 130 is fixed, as the number of logical blocks participating in the fusion group 130 increases, the utilization rate increases. As an example, when the number of redundant blocks included in the fusion group 130 is fixed as ten, and five logical blocks have entered the fusion group 130, the utilization rate of the fusion group 130 may be 5/15. Also, when 10 logical blocks have joined the fusion group 130, the utilization rate of the fusion group 130 may be 10/20.

As the utilization rate increases, a cost for the garbage collection operation with respect to the fusion group 130 increases. Also, as a large number of logical blocks join the fusion group 130, a probability that a sector in the fusion group 130 is referenced or updated is high. A case that the sector in the fusion group 130 is updated may be referred to as a fusion group hit. As more logical blocks enter the fusion group 130, the hit ratio increases.

When a write is requested to a sector in the fusion group 130, the corresponding sector may be written to an unused pages in the buffering block with a relatively small amount of cost. To calculate an average sector update cost with respect to sectors in the fusion group 130, a model that an update of each sector shares a garbage collection cost may be used.

Since a host has a high probability of referring to the sector based on temporal locality and spatial locality, a block including relatively recently referenced sectors has a high probability of reference to the same sectors or adjacent sectors in the same block. If the block joins the Fusion group 130, it may increases hit ratio with respect to Fusion group 130.

Accordingly, as a large number of logical blocks are assigned to the fusion group 130, the hit ratio with respect to the fusion group 130 increases. In the mean time, the memory management apparatus 200 performs the garbage collection operation by using a limited free space in the fusion group 130, more accurately, by using a space of redundant blocks participating in the fusion group 130. Accordingly, as the utilization rate of the fusion group 130 increases, the cost of the garbage collection operation increases.

Therefore, it is expected that as the utilization rate increases, the hit ratio with respect to the fusion group 130 increases, whereas the average cost of the garbage collection operation increases. Accordingly, the memory management apparatus 200 may calculate an optimized utilization rate with respect to the fusion group 130 by using a mathematical model of the average cost of the garbage collection operation and utilization rate. The optimized utilization rate may be set as a utilization rate for minimizing a sector update cost of the fusion group 130.

In the present specification, a cost of an operation indicates a resource required for performing the operation. The resource, as an example, may indicate a time, a cpu cycle or a space of the flash memory 100. Hereinafter, although a mathematical model with respect to the time is described, it is apparent to one skilled in the art that the resource or cost is not limited to the time.

The memory management apparatus 200 may define a mathematical model with respect to a fusion operation cost, a defusion operation cost, and a page update cost of the fusion group 130. An update cost expended for updating map information that is stored in a main memory or a meta block 110 of the flash memory 100 is regarded as relatively small, compared with costs of other operations, and thus, the memory management apparatus 200 may not consider the update cost of the map information.

As an example, in a case of the fusion operation, since it only requires marking, to the map, that the physical block B2 and the logical block B2' are included in the fusion group 500, as illustrated in FIG. 5, the update cost of the map information is significantly small.

To define the defusion operation cost, the page update cost of the fusion group 130 and a garbage collection cost of the fusion group 130 are required to be defined.

The garbage collection cost is proportional to the utilization rate of the fusion group 130. When the utilization rage of the fusion group 130 is $u_f$, the utilization rate u of a block that is target for the garbage collection operation may be defined as given in Equation 1 below. u may be less than or equal to $u_f$.

$$u_f = \frac{(u-1)}{\ln u} \qquad \text{[Equation 1]}$$

Here, ln is a natural log.

An average garbage collection operation cost $C_{CG}$ may be defined as given in Equation 2 below.

$$C_{GC} = u \times N_P \times C_{CP} + C_E \qquad \text{[Equation 2]}$$

Here, $N_P$ is a number of pages that a single block may include, $C_{CP}$ is a cost for copying a page from a block to another block, $C_E$ is a cost for erasing a block.

The garbage collection operation erases a block with $C_E$ cost to generate a redundant block, and copies $u \times N_P$ pages, to the generated redundant block, from a block selected as a target for the garbage collection operation.

When the garbage collection operation is performed, the block to which the pages are copied becomes a new buffering block and the buffering block has $(1-u) \times N_P$ empty pages. In this instance, hereafter, modified sector data may be written to the empty pages. Accordingly, whenever data is written in $(1-u) \times N_P$ pages, on average, the garbage collection operation is performed with respect to the fusion group 130. Therefore, the garbage collection cost may be regarded to be shared with page write operations and it may be defined as an average page write cost. The average page write cost $C_{PW}$ may be expressed as given in Equation 3 below.

$$C_{pw} = \frac{C_{GC}}{(1-u) \times N_p} \qquad \text{[Equation 3]}$$

The defusion operation select a target logical block for defusion operation, erases the block with $C_E$ cost to generate a redundant block, and copies all separated pages of the target logical block to the generated redundant block. In this instance, a copy cost is $N_P \times C_{CP}$.

After Defusion operation, the memory apparatus 200 may check there are, at least, two empty blocks. If only one empty block exists, it may try to perform garbage collection operation to make more empty blocks. For garbage collection operation, a block having a smallest number of valid pages is selected in the fusion group 130, and valid pages in the selected block are copied to the buffering block to generate an empty block. A cost for the above is $u \times N_P \times C_{PW}$. Since garbage collection may be performed with the single empty block during the copying, the copy cost is calculated based on the average page write cost. Therefore, the defusion operation cost $C_{def}$ may be expressed as given in Equation 4.

$$C_{def} = N_P \times C_{CP} + C_E + u \times N_P \times C_{pw} \qquad \text{[Equation 4]}$$

If the memory management apparatus 200 want to maintain specific utilization rate u, then the memory management apparatus 200 may defuse another logical block included in the fusion group 130 when a new logical block enters the fusion group 130. When a reference probability is r for fusion group, reference requests with respect to sectors that are not included in the fusion group 130 are performed with a probability of (1−r). In this instance, the reference probability is a ratio of a number of sector update requests with respect to sectors of the fusion group 130 to a number of sector update requests with respect to the flash memory 100.

An average write cost $C_{avgw}$ of the memory management apparatus 200 is a sum of the page write cost $C_{PW}$ and the defusion operation cost that is performed with a probability of (1−r). It may be expressed as given in Equation 5 below.

$$C_{avgw} = (1-r)C_{def} + C_{pw} \quad \text{[Equation 5]}$$

The reference probability r is dependent upon the utilization $u_f$ of the fusion group 130. Since a host accesses the flash memory 100 with a temporal locality and spatial locality, it is expected that as $u_f$ increases, r increases Depending on applications, a host may access the flash memory 100 with a relatively high locality, or a host may randomly access the flash memory 100.

As $u_f$ increases, the reference probability r increases. However, an increasing tendency of the reference probability r may be saturated according to an access tendency of the host. Also it may be slowed down if working set of reference pattern is already loaded into Fusion group 130.

As an example, in a case that the host's access to the flash memory with the relatively high locality, when the utilization rate $u_f$ is greater than or equal to ¾, the reference probability r may converge to 0.8. Conversely, in a case that the host relatively randomly accesses the flash memory 100, when the utilization rate $u_f$ is greater than or equal to ⅗, the reference probability r may converge to 0.7.

As the utilization rate $u_f$ increases from a value close to zero, the reference probability r increases and the average write cost $C_{avgw}$ decreases. However, when the utilization rate $u_f$ increases more, the increasing tendency of the reference probability r is slowed, and the average write cost $C_{avgw}$ increases again since the garbage collection cost increases.

Accordingly, the memory management apparatus 200 may select a utilization rate $u_f$ that minimizes the average write cost $C_{avgw}$, and may define the selected utilization rate $u_f$ as the optimized utilization rate.

When the file system 240 is optimized to convert a file access request from an operating system to a sequential reference with respect to the flash memory 100, a ratio of sequential references with respect to an FTL and the memory management apparatus 200 may increase.

The memory management apparatus 200 may sequentially store data in blocks included in a sequential group 120, and thus, blocks may be frequently reused by switch merging as the ratio of sequential references increases. Since a cost for switch merging is smaller than the defusion operation cost or the garbage collection operation cost of the fusion group 130, the average write cost may be reduced more when the memory management apparatus 200 is combined with the optimized file system 240.

The method performed in the memory management apparatus 200 according to example embodiments may be recorded in computer-readable media including program instructions to implement various operations embodied by a computer. The media may also include, alone or in combination with the program instructions, data files, data structures, and the like. The media and program instructions may be those specially designed and constructed for the purposes of example embodiments, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), non-sequential access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of example embodiments, and vice versa.

Flash memory devices and/or memory controllers according to example embodiments may be embodied using various types of packages. For example, the flash memory devices and/or memory controllers may be embodied using packages such as Package on Packages (PoPs), Ball Grid Arrays (BGAs), Chip Scale Packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline Integrated Circuit (SOIC), Shrink Small Outline Package (SSOP), Thin Small Outline (TSOP), System In Package (SIP), Multi Chip Package (MCP), Wafer-level Fabricated Package (WFP), Wafer-Level Processed Stack Package (WSP), and the like.

The flash memory devices and/or the memory controllers may constitute memory cards. In this case, the memory controllers may be constructed to communicate with an external device for example, a host using any one of various types of protocols such as a Universal Serial Bus (USB), a Multi Media Card (MMC), a Peripheral Component Interconnect-Express (PCI-E), Serial Advanced Technology Attachment (SATA), Parallel ATA (PATA), Small Computer System Interface (SCSI), Enhanced Small Device Interface (ESDI), and Integrated Drive Electronics (IDE).

The flash memory devices may be non-volatile memory devices that can maintain stored data even when power is cut off. According to an increase in the use of mobile devices such as a cellular phone, a personal digital assistant (PDA), a digital camera, a portable game console, and an MP3 player, the flash memory devices may be more widely used as data storage and code storage. The flash memory devices may be used in home applications such as a high definition television (HDTV), a digital video disk (DVD), a router, and a Global Positioning System (GPS).

A computing system according to example embodiments may include a microprocessor that is electrically connected with a bus, a user interface, a modem such as a baseband chipset, a memory controller, and a flash memory device. The flash memory device may store N-bit data via the memory controller. The N-bit data is processed or will be processed by the microprocessor and N may be 1 or an integer greater than 1. When the computing system is a mobile apparatus, a battery may be additionally provided to supply operation voltage of the computing system.

It will be apparent to those of ordinary skill in the art that the computing system according to example embodiments may further include an application chipset, a camera image processor (CIS), a mobile Dynamic Non-sequential access Memory (DRAM), and the like. The memory controller and the flash memory device may constitute a solid state drive/disk (SSD) that uses a non-volatile memory to store data.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

According to an embodiment of the present invention, a memory management apparatus and method may classify variable number of non-sequential blocks and redundant blocks as a fusion group to improve efficiency in a garbage collection operation that uses a limited number of redundant blocks.

According to an embodiment of the present invention, a memory management apparatus and method may classify and separately manage a block where data is sequentially stored, to reduce a cost expended for reusing the block where the data is sequentially stored.

According to an embodiment of the present invention, a memory management apparatus and method may apply a page mapping scheme in a block selected as a fusion group, to reduce a data update cost through a non-sequential reference operation.

According to an embodiment of the present invention, a memory management apparatus and method may classify a sequential reference and a non-sequential reference, and may selectively apply various merge schemes or a garbage collection scheme with respect to each reference operation, to reduce a data update cost for an entire non-volatile memory.

According to an embodiment of the present invention, a memory management apparatus and method may dynamically convert a block in the fusion group into a sequential group, and may dynamically put a block in the sequential group into the fusion group to flexibly cope with a reference pattern, thereby improving efficiency.

According to an embodiment of the present invention, a memory management apparatus and method may establish a mathematical model with respect to a garbage collection operation cost and a reference operation cost, to optimize a fusion group.

What is claimed is:

1. An apparatus of managing a memory, the apparatus comprising:
    a block classification unit to classify each of a plurality of blocks of a non-volatile memory into either a first group or a second group based on a locality of access operations with respect to each of the plurality of blocks, wherein when a block among the plurality of blocks corresponds to a sequential access operation, the block classification unit classifies the block into the first group, and wherein when the block corresponds to a non-sequential access operation, the block classification unit classifies the block into the second group; and
    a mapping unit to store data sectors sequentially in blocks of the first group, and to store data sectors using a page mapping in blocks of the second group,
    wherein the block classification unit classifies at least one redundant block among a plurality of redundant blocks of the non-volatile memory into the second group.

2. The apparatus of claim 1, wherein the block classification unit classifies a first block as the first group when pages of the first block of the second group are stored sequentially.

3. The apparatus of claim 1, wherein the block classification unit classifies a first block as the second group when pages of the first block of the first group are not updated sequentially and, eventually, are not stored sequentially.

4. The apparatus of claim 1, wherein the block designation unit designates a block, among the plurality of blocks, where each of the data sectors is respectively stored once as the sequential group.

5. The apparatus of claim 1, wherein the block classification unit maintains at least two empty blocks in the second group.

6. The apparatus of claim 1, wherein the block classification unit determines a number of blocks of the second group and a number of redundant blocks of the second group based on at least one of an average cost of a defusion operation, an average cost of a page write operation, and a ratio of a number of access operations with respect to the second group to a number of access operations with respect to the non-volatile memory.

7. The apparatus of claim 6, wherein the block classification unit obtains the average cost of the defusion operation and the average cost of the page write operation based on an average cost of a garbage collection operation with respect to the second group.

8. The apparatus of claim 6, wherein the defusion operation is an operation that classifies a first block as the first group and excludes the first block from the second group when pages of the first block of the second group are stored sequentially.

9. The apparatus of claim 7, wherein the defusion operation is an operation that classifies a first block as the first group and excludes the first block from the second group when pages of the first block o the second group are stored sequentially.

10. An apparatus of managing a memory, the apparatus comprising:
    a block classification unit to classify each of a plurality of blocks of a non-volatile memory into a first group and a second group based on a locality of access operations with respect to each of the plurality of blocks; and
    a mapping unit to store data sectors sequentially in blocks of the first group, and to store data sectors using a page mapping in blocks of the second group,
    wherein the block classification unit determines a number of blocks of the second group and a number of redundant blocks of the second group based on at least one of an average cost of a defusion operation, an average cost of a page write operation, and a ratio of a number of access operations with respect to the second group to a number of access operations with respect to the non-volatile memory.

11. The apparatus of claim 10, wherein the block classification unit obtains the average cost of the defusion operation and the average cost of the page write operation based on an average cost of a garbage collection operation with respect to the second group.

12. The apparatus of either claim 11, wherein the defusion operation is an operation that classifies a first block as the first group and excludes the first block from the second group when pages of the first block of the second group are stored sequentially.

13. The apparatus of either claim 10, wherein the defusion operation is an operation that classifies a first block as the first group and excludes the first block from the second group when pages of the first block of the second group are stored sequentially.

14. A computer storage medium encoding a computer program of instructions for executing a computer process for managing a memory, the computer process comprising:
    determining a locality of access operations with respect to each of a plurality of blocks of a non-volatile memory;

determining each of the plurality of blocks as one of a sequentially-accessed block, a non-sequentially-accessed block, and a redundant block, based on the determined locality;

classifying the non-sequential block and at least one redundant block among blocks determined as the redundant block as a second group; and storing data sectors using a page mapping for blocks classified as the second group.

15. The computer process of claim 14, further comprising:
classifying a first block as the first group when pages of the first block of the second group are stored sequentially.

16. The computer process of claim 14, further comprising:
classifying a first block as the second group when pages of the first block of the first group are not updated sequentially and, eventually, are not stored sequentially.

17. The computer process of claim 14, wherein the determining of each of the plurality of blocks comprising:
classifying a block, among the plurality of blocks, where each of data sectors is respectively stored once as the sequential group.

18. The computer process of claim 14, further comprising determining a number of logical blocks of the second group and a number of redundant blocks of the second group based on at least one of an average cost of a defusion operation, an average cost of a page write operation, and a ratio of a number of access operations with respect to the second group to a number of access operations with respect to the non-volatile memory.

19. The computer process of claim 18, wherein the determining of the number of logical blocks of the second group and the number of redundant blocks of the second group obtains the average cost of the de fusion operation and the average cost of the page write operation based on an average cost of a garbage collection operation with respect to the second group.

20. A computer storage medium encoding a computer program of instructions for executing a computer process for managing a memory, the computer process comprising:
determining a locality of access operations with respect to each of a plurality of blocks of a non-volatile memory;

determining each of the plurality of blocks as one of a sequential block, a non-sequential block, and a redundant block, based on the determined locality;

classifying the non-sequential block and the redundant block as a second group;

storing data sectors using a page mapping for blocks classified as the second group; and determining a number of logical blocks of the second group and a number of redundant blocks of the second group based on at least one of an average cost of a defusion operation, an average cost of a page write operation, and a ratio of a number of access operations with respect to the second group to a number of access operations with respect to the non-volatile memory.

21. The computer process of claim 20, wherein the determining of the number of logical blocks of the second group and the number of redundant blocks of the second group obtains the average cost of the defusion operation and the average cost of the page write operation based on an average cost of a garbage collection operation with respect to the second group.

* * * * *